US012569915B2

(12) United States Patent
Kopschinski

(10) Patent No.: US 12,569,915 B2
(45) Date of Patent: Mar. 10, 2026

(54) SYSTEM AND METHOD FOR DISTRIBUTING RAW MATERIAL POWDER TO A PLURALITY OF ADDITIVE MANUFACTURING MACHINES

(71) Applicant: Nikon SLM Solutions AG, Lübeck (DE)

(72) Inventor: Daniel Kopschinski, Lübeck (DE)

(73) Assignee: NIKON SLM SOLUTIONS AG, Lübeck (DE)

( * ) Notice: Subject to any disclaimer, the term of this patent is extended or adjusted under 35 U.S.C. 154(b) by 22 days.

(21) Appl. No.: 18/569,637

(22) PCT Filed: Jun. 13, 2022

(86) PCT No.: PCT/EP2022/065976
§ 371 (c)(1),
(2) Date: Dec. 13, 2023

(87) PCT Pub. No.: WO2023/011784
PCT Pub. Date: Feb. 9, 2023

(65) Prior Publication Data
US 2024/0269751 A1 Aug. 15, 2024

(30) Foreign Application Priority Data
Aug. 6, 2021 (DE) ..................... 10 2021 208 613.6

(51) Int. Cl.
*B22F 12/70* (2021.01)
*B22F 12/55* (2021.01)
(Continued)

(52) U.S. Cl.
CPC .............. *B22F 12/70* (2021.01); *B22F 12/55* (2021.01); *B22F 12/57* (2021.01); *B22F 12/84* (2021.01);
(Continued)

(58) Field of Classification Search
CPC .......... B22F 12/70; B22F 12/55; B22F 12/57; B22F 12/84; B22F 12/50; B22F 12/82;
(Continued)

(56) References Cited

U.S. PATENT DOCUMENTS

| | | | |
|---|---|---|---|
| 7,296,599 B2 * | 11/2007 | Cox ........................ | B65G 53/22 |
| | | | 141/67 |
| 11,130,179 B2 * | 9/2021 | de Lajudie .............. | B29C 64/35 |

(Continued)

FOREIGN PATENT DOCUMENTS

| | | |
|---|---|---|
| DE | 202019106061 U1 | 11/2019 |
| EP | 3659729 A1 | 6/2020 |

(Continued)

*Primary Examiner* — Nicolas A Arnett
(74) *Attorney, Agent, or Firm* — McGlew and Tuttle, P.C.

(57) ABSTRACT

A system distributes raw material powder from a reservoir to a plurality of at least two additive manufacturing machines. The system includes at least one gas flow drive and at least two conveying lines for conveying the powder to the at least two manufacturing machines by a gas flow driven by the at least one gas flow drive. The system further includes a feeding manifold for feeding the at least two conveying lines with the raw material powder. The feeding manifold is configured and arranged to selectively guide, controlled by at shut-off valves, the raw material powder into one of the at least two conveying lines. Each of the shut-off valves is arranged at the feeding manifold and is configured to selectively close and open for selectively feeding the at least two conveying lines with the raw material powder.

25 Claims, 5 Drawing Sheets

(51) Int. Cl.

| | |
|---|---|
| *B22F 12/57* | (2021.01) |
| *B22F 12/84* | (2021.01) |
| *B29C 64/182* | (2017.01) |
| *G01F 13/00* | (2006.01) |
| *B22F 10/28* | (2021.01) |
| *B22F 10/73* | (2021.01) |
| *B33Y 30/00* | (2015.01) |
| *B33Y 40/10* | (2020.01) |
| *B65G 53/56* | (2006.01) |

(52) U.S. Cl.
CPC .......... B29C 64/182 (2017.08); G01F 13/005 (2013.01); *B22F 10/28* (2021.01); *B22F 10/73* (2021.01); *B33Y 30/00* (2014.12); *B33Y 40/10* (2020.01); *B65G 53/56* (2013.01); *Y02P 10/25* (2015.11)

(58) Field of Classification Search
CPC ........ B22F 10/28; B22F 10/73; B29C 64/182; B29C 64/321; B33Y 30/00; B33Y 40/10; B65G 53/56; G01F 13/005; Y02P 10/25
See application file for complete search history.

(56) References Cited

U.S. PATENT DOCUMENTS

| | | | | |
|---|---|---|---|---|
| 11,590,537 | B2 * | 2/2023 | Charlebois | ................ B07B 1/54 |
| 11,759,861 | B2 * | 9/2023 | Halla | .................... B29C 64/371 |
| | | | | 419/57 |
| 11,759,864 | B2 * | 9/2023 | Saito | ....................... B22F 12/70 |
| | | | | 425/78 |
| 11,938,539 | B2 * | 3/2024 | Halla | ...................... B22F 12/33 |
| 2018/0021855 | A1 * | 1/2018 | De Lajudie | ............ B33Y 10/00 |
| | | | | 419/26 |
| 2018/0185963 | A1 * | 7/2018 | Ostroverkhov | ...... B23K 26/123 |
| 2020/0061655 | A1 * | 2/2020 | Wakelam | .............. B29C 64/153 |
| 2021/0170494 | A1 * | 6/2021 | Mamrak | ................ B22F 12/70 |
| 2022/0355384 | A1 * | 11/2022 | Kopschinski | .......... B33Y 40/00 |

FOREIGN PATENT DOCUMENTS

| | | | |
|---|---|---|---|
| JP | S5238888 | A | 3/1977 |
| JP | 2018506651 | A | 3/2018 |
| JP | 2021084291 | A | 6/2021 |
| WO | 2019125464 | A1 | 6/2019 |
| WO | 2019211564 | A1 | 11/2019 |

* cited by examiner

B-B

B-B

SYSTEM AND METHOD FOR DISTRIBUTING RAW MATERIAL POWDER TO A PLURALITY OF ADDITIVE MANUFACTURING MACHINES

CROSS REFERENCE TO RELATED APPLICATIONS

This application is a U.S. National Phase Application of International Application PCT/EP2022/065976, filed Jun. 13, 2022, and claims the benefit of priority under 35 U.S.C. § 119 of German Application 10 2021 208 613.6, filed Aug. 6, 2021, the entire contents of which are incorporated herein by reference.

TECHNICAL FIELD

The present invention pertains to a system and method for distributing raw material powder from a reservoir of raw material powder to a plurality of at least two additive manufacturing machines. In particular, the present disclosure relates to additive manufacturing facilities for serial production at an industrial scale, wherein the additive manufacturing facility comprises a plurality of additive manufacturing machines for parallel additive manufacturing of three-dimensional workpieces. More particularly, the additive manufacturing machines are preferably configured to apply laser powder bed fusion (LPBF) as the additive manufacturing technique for producing metallic workpieces.

BACKGROUND

Additive manufacturing of a three-dimensional workpiece is often referred to as 3D-printing. A specific form of additive manufacturing is laser powder bed fusion (LPBF), in which a layer of raw material powder is exposed to a high energy beam of electromagnetic radiation, such as, for example, a laser beam or a particle beam, for selectively sintering and/or melting particles of the raw material powder. The three-dimensional workpiece is manufactured by sequentially sintering and/or melting layer by layer of raw material powder.

Compared to conventional manufacturing techniques like molding, additive manufacturing of a single three-dimensional workpiece consumes considerably more time. Therefore, in the early days of 3D-printing, additive manufacturing was only applied for prototyping or for a small number of individual pieces. However, as additive manufacturing offers the possibility to design and produce components that cannot be used by other conventional manufacturing techniques, there is a demand for using additive manufacturing for serial production at an industrial scale. The development of additive manufacturing over the last decades has reduced the production time per layer to a certain extent, for instance by using several lasers in parallel. However, the reduction of production time per layer is limited. Therefore, in order to use additive manufacturing for serial production at an industrial scale, components must be manufactured in parallel. For instance, a plurality of hundreds or thousands of smaller components can be arranged in a densely packed arrangement of components forming a three-dimensional workpiece that uses the available production volume to the best. However, also the maximum available production volume is limited. In order to use additive manufacturing for even more parallel processing, an additive manufacturing facility may comprise a plurality of additive manufacturing machines or process chambers. The number of additive manufacturing machines to be run in parallel is in principle unlimited.

As each additive manufacturing process may need a supply of raw material powder, it is inefficient to provide the necessary infrastructure for the supply of raw material powder separately for each additive manufacturing machine. It is more efficient to provide a common infrastructure for the supply of raw material powder to a plurality of additive manufacturing machines. For example, US 2018/0021855 A1 discloses a method for managing powder supply in an additive manufacturing facility comprising a plurality of machines. U.S. Pat. No. 7,296,599 B2 A1 describes a method and apparatus for pneumatic powder transfer from a powder supply container to a single laser sintering system, wherein the powder supply container is pressurized to press powder into a supply line. DE 20 2019 106 061 U1 describes another powder conveying system for a single additive manufacturing machine.

A problem of known powder conveying systems is to ensure that a defined flow rate of raw material powder is steadily distributed to the additive manufacturing machines, and that the risk of clogging and valve wear due to the abrasive nature of the raw material powder is reduced.

SUMMARY

An object of the present disclosure to provide a system and method for distributing a defined flow rate raw material powder more steadily from a reservoir of raw material powder to a plurality of at least two additive manufacturing machines for additive manufacturing with a reduced risk of clogging and valve wear.

A solution to this problem is given by the subject-matter of the independent claims. Preferred embodiments can be deduced from the dependent claims, the description and the figures.

According to a first aspect of the present disclosure, a system is provided for distributing raw material powder from a reservoir of raw material powder to a plurality of at least two additive manufacturing machines for additive manufacturing, the system comprising at least one gas flow drive and at least two conveying lines for conveying raw material powder to the at least two additive manufacturing machines by a gas flow driven by the at least one gas flow drive, characterized in that the system further comprises a feeding manifold for feeding the at least two conveying lines with raw material powder, wherein the feeding manifold is configured and arranged to selectively guide, controlled by means of at least two shut-off valves, raw material powder into one of the at least two conveying lines, wherein each of the at least two shut-off valves is arranged at the feeding manifold and configured to selectively close and open for selectively feeding the at least two conveying lines with raw material powder.

This means that the feeding manifold is not part of the conveying lines, which allows to convey the raw material powder through the conveying lines by the gas flow without branching or valves on the path towards the additive manufacturing machines, i.e. downstream of the feeding manifold and upstream of the additive manufacturing machines.

Optionally, the feeding manifold may comprise a manifold inlet for receiving raw material powder from the reservoir, a pipe branching into at least two manifold branches and at least two manifold outlets each in connection with one of the at least two conveying lines, wherein each of the at least two manifold branches connects the manifold inlet to one of the at least two manifold outlets, wherein each of the at least two shut-off valves is associated with and arranged at one of the at least two manifold branches and configured to selectively close and open the associated manifold branch.

Optionally, the pipe branching may be configured to be located at a higher altitude than the at least two manifold outlets, so that the raw material powder is transported through the at least two manifold branches predominantly by gravitation. Thus, the raw material powder preferably falls and/or slides through the feeding manifold into the gas flow in the conveying line. In addition, the gas flow in any of the conveying lines may provide a Venturi suction effect for sucking the raw material powder out of the connected manifold outlet. The cross section of the conveying lines may be somewhat reduced at the connected manifold outlet to increase the Venturi suction effect. Alternatively, or in addition, the gas flow driven by the at least one gas flow drive may be partly or fully guided through the manifold branches for conveying the raw material powder through the feeding manifold.

Optionally, the feeding manifold may be configured to be arranged above a section of each of the at least two conveying lines, and wherein each manifold outlet leads essentially from above into the section of one of the at least two conveying lines. Thereby, the raw material powder can fall into the gas flow along the conveying line. The section of each of the at least two conveying lines extends preferably essentially horizontally underneath the feeding manifold. Preferably, at least a section of the manifold branch extends essentially vertically.

Optionally, the feeding manifold is formed to eject the raw material powder into the at least two conveying lines with a momentum component parallel to a conveying direction along the conveying lines. The conveying direction is here the gas flow direction. So, the manifold branch may be bended and/or tilted at a bottom section at the manifold outlet so that the average momentum vector of the raw material powder is preferably not perpendicular to the gas flow direction, but comprises already a momentum component parallel to the gas flow before entering the gas flow. This has the further advantage that the gas flow is less likely to enter the manifold branch at the manifold outlet and to push the raw material powder back upward.

Optionally, the feeding manifold may comprise n≥2 manifold branches, wherein n∈N, and wherein the manifold branches connect to a manifold inlet at a pipe branching in an n-fold rotational symmetry with respect to a central vertical axis of the manifold inlet. This is a very compact and preferred design facilitating an even distribution of raw material powder among the manifold branches. The manifold branches may extend laterally and downward from the pipe branching similar to spider legs.

Optionally, the feeding manifold may comprise at least two manifold branches, wherein each of the at least two manifold branches comprises an inclined section, which is preferably inclined by 20 to 70 degrees with respect to a central vertical axis of a manifold inlet. Thus, the raw material powder may slide along the inclined section driven by gravity. The shut-off valve may preferably be arranged at the inclined section.

Optionally, the feeding manifold may comprise at least two manifold branches having the same pipe length ranging from a pipe branching to the at least two conveying lines. This is beneficial for evenly distributing raw material powder among the manifold branches.

Optionally, sections of each of the at least two conveying lines may be arranged in parallel below the feeding manifold. This is advantageous for a compact and orderly system design.

Optionally, each of the at least two shut-off valves may be a butterfly valve. Alternatively, or in addition, one or more of the at least two shut-off valves may be of another kind of valve, e.g. a solenoid valve, a ball valve, a gate valve, a piston valve, a needle valve, a pinch valve, or another valve type. Each of the at least two shut-off valves may comprise a valve motor for actuating a valve body.

Optionally, each of the at least two shut-off valves may be arranged at an inclined section of one of at least two manifold branches of the feeding manifold and comprises a valve body actuatable around an actuator axis essentially perpendicular to a longitudinal axis of the inclined section of the manifold branch, wherein the actuator axis and the longitudinal axis of the inclined section of the manifold branch span a virtual plane that is inclined with respect to a virtual vertical plane. This is advantageous for a compact arrangement of the shut-off valves. Optionally, the actuator axis may be also inclined with respect to a virtual horizontal plane. This is due to the fact that the raw material powder preferably slides along the inclined section of the manifold branch.

Optionally, the system may further comprise a dosing unit, wherein the dosing unit comprises a conveying mechanism for conveying a controlled flow of raw material powder from an outlet of the reservoir to a manifold inlet. Preferably, the dosing unit may comprise a screw conveyor, wherein the screw conveyor is arranged and configured to convey the raw material powder from a first position at the outlet of the reservoir to a second position at the manifold inlet, wherein the second position is at a higher altitude than the first position and/or wherein the second position is horizontally distanced from the first position. Alternatively, or in addition, the dosing unit may comprise another kind of conveyor, e.g. a conveyor belt or vibrating chute.

Optionally, the at least two shut-off valves may be configured to open only one of the at least two shut-off valves at a time. This makes the control of a steady constant gas flow easier, so that a steadier flow of raw material powder can be achieved. If there are demand conflicts among different additive manufacturing machines, a resource management system may manage the sequential distribution of raw material powder to only one of the additive manufacturing machines at a time.

Optionally, the at least two shut-off valves may be arranged closer to a pipe branching of the feeding manifold than to the at least two conveying lines. The larger the distance of the valve to the pipe branching is, the more raw material powder accumulates in the pipe branch when the shut-off valve is closed. In order to keep the volume of raw material powder accumulating in the manifold branch at a minimum, the distance of the valve to the pipe branching is preferably chosen to be as small as possible, preferred less than 2 meters, more preferred less than 1 meter, most preferred less than 50 cm.

Optionally, all of the at least two shut-off valves may have the same distance to a pipe branching of the feeding manifold. This is beneficial to make sure that the volume of raw material powder accumulating in the manifold branch, when the shut-off valve is closed, is essentially the same for all manifold branches. Optionally, the distance may define a manifold volume for accommodating a defined amount of raw material powder resting on a valve body of each of the at least two shut-off valves when closed.

Optionally, the system may further comprise a shaking unit for shaking and/or vibrating, for instance by ultrasonic and/or pneumatic and/or electric vibrations, the feeding manifold to facilitate falling of the raw material powder through the feeding manifold. This is advantageous to prevent clogging, clumping, and/or accumulations of residual raw material powder within the feeding manifold.

Optionally, the system may comprise alternative or additional means to facilitate falling of the raw material powder through the feeding manifold, e.g. one or more nozzles to blow gas into the accumulated powder in the feeding manifold and/or one or more stirrers.

Optionally, the feeding manifold may comprise at least one vibration attenuation element for attenuating propagation of vibrations from the feeding manifold to the at least two conveying lines and/or towards the reservoir. Preferably, the at least one vibration attenuation element "decouples" the feeding manifold from other parts of the system connected thereto in terms of propagation of vibrations generated by the shaking unit, in order to prevent or at least reduce propagation of those vibrations into the other parts of the system.

Optionally, the at least two conveying lines may be free of gas flow regulation valves downstream of the feeding manifold and upstream of the at least two additive manufacturing machines. This is very beneficial, because the at least two conveying lines convey the majority of raw material powder on this path and the wear in any gas flow regulation valve on this path would be high due to the abrasive nature of the raw material powder.

Optionally, the at least two conveying lines may be part of a gas flow circulation loop, wherein the gas flow drive is configured to drive a gas flow circulating in the gas flow circulation loop. Preferably, the at least two conveying lines are parallel lines of the gas flow circulation loop connected to the gas flow drive.

Optionally, the system may further comprise at least two gas flow regulation valves, wherein each of the at least two gas flow regulation valves is associated with one of the at least two conveying lines for selectively regulating the gas flow in the associated conveying line, wherein the at least two gas flow regulation valves are arranged downstream of at least two additive manufacturing machines and upstream of the feeding manifold. So, the at least two gas flow regulation valves are preferably arranged in parallel gas return lines that return the gas flow back towards the gas flow drive. Preferably, there may be one parallel gas return line with a gas flow regulation valve for each conveying line. At the additive manufacturing machine, the raw material powder is preferably separated from the gas flow by a separator, e.g. a cyclonic separator or vacuum conveyor, in order to fill a raw material powder buffer of the additive manufacturing machine. Thus, the amount of raw material powder is strongly reduced in the gas return line that guides the gas flow back towards the gas flow drive. Therefore, the gas flow regulation valves in the gas return lines are less exposed to abrasive wear of raw material powder. Additional particle filters can be located upstream of the pump and/or at an inlet of the pump.

Downstream of the at least two gas flow regulation valves, the parallel gas return lines may join into a pump inlet line connected to a suction side of a gas pump acting as a gas flow drive. The pressure side of the gas pump may be connected via a pump outlet line to the parallel conveying lines, which thus closes the gas flow circulation loop. In order to protect the gas pump from residual amounts of raw material powder in the return gas flow, there may be a vacuum conveyor, or another separator device arranged at the pump inlet line for separating residual amounts of raw material powder from the gas return flow. Such residual amounts of raw material powder may be sifted and recycled to refill the reservoir of raw material powder. The reservoir of raw material powder may be refilled in addition with fresh raw material powder and/or with recycled raw material powder that was not sintered or melted in the additive manufacturing machines.

According to a second aspect of the present disclosure, an additive manufacturing facility is provided comprising:
   a plurality of at least two additive manufacturing machines for parallel additive manufacturing of three-dimensional work pieces, and
   a system as described above for distributing raw material powder from a reservoir of raw material powder to the at least two additive manufacturing machines.

Optionally, the additive manufacturing facility further comprises a gas flow circulation loop with a gas flow drive, wherein the gas flow drive is configured to drive a gas flow circulating in the gas flow circulation loop, wherein the at least two conveying lines of the system are parallel lines of the gas flow circulation loop.

According to a third aspect of the present disclosure, a method is provided for distributing raw material powder from a reservoir of raw material powder to a plurality of at least two additive manufacturing machines for parallel additive manufacturing of three-dimensional work pieces, the method comprising:
   selectively regulating a gas flow in at least two conveying lines, wherein each of the at least two conveying lines is associated with one of the at least two additive manufacturing machines for conveying raw material powder to the associated additive manufacturing machine by the gas flow,
   selectively opening and closing at least two shut-off valves of a feeding manifold, wherein each shut-off valve is associated with one of the at least two conveying lines for selectively letting raw material powder fall into the gas flow in the associated conveying line.

The method may be implemented in form of hardware as a control device as part of the system or facility described above and/or in form of a software program being executable on a computer device as part of the system or facility described above.

Optionally, the gas flow may be selectively regulated before any one of the at least two shut-off valves is opened. Thereby, the raw material powder does enter the conveying line without gas flow, which could lead to congestions by raw material powder accumulating in the conveying line. Instead, it should preferably fall into the present gas flow to be carried away immediately to ensure that it does not rest within the conveying line.

Optionally, the gas flow may be selectively regulated by at least two gas flow regulation valves, wherein each of the at least two gas flow regulation valves is associated with one of the at least two conveying lines for selectively regulating the gas flow in the associated conveying line, wherein the at least two gas flow regulation valves are arranged downstream of the at least two additive manufacturing machines and upstream of the feeding manifold. A control device and/or a programmed computer device may be signal-connected wirelessly or by wire with each of the at least two gas flow regulation valves to control them individually.

Optionally, the gas flow may be selectively regulated to allow a gas flow in only one of the at least two conveying lines at a time. So, the gas flow driven by the gas flow drive does not have to be adapted to parallel gas flows in the conveying lines. This facilitates providing a steady and even distribution of a defined gas flow through the conveying lines.

Optionally, only one of the at least two shut-off valves is opened at a time, which is preferably the two shut-off valve that is associated with the conveying line currently having a gas flow. A control device and/or a programmed computer device may be connected wirelessly or by wire with each of the at least two shut-off valves to control them individually. Preferably, the control device and/or a programmed computer device is the same that is signal-connected to the gas flow regulation valves. The same control device and/or a programmed computer device may be used to control the dosing unit and/or the shaking unit.

Different kinds of sensors can be used within the system to control the gas flow and/or other system parameters, e.g. oxygen sensors, pressure sensors, flow sensors or any other suitable sensor. The sensors may be connected to a controller. Pressure sensors can be used to detect blockages or leakages. Flow sensors, in particular located downstream of the pump, can be used to regulate the pump output in relation to the amount and sort of powder to be transported. Control variables may be pump speed, pump flow, dosing capacity and/or pressure difference across the pump.

In a preferred embodiment, each conveying line may comprise at least one of an oxygen sensor, a pressure sensor or a flow sensor, in particular each conveying line may comprise at least a pressure sensor and/or a flow sensor. With this arrangement, malfunctions of the system may easily be detected, e.g. a controller may monitor the sensor values and compare them with expected values and/or threshold values. The controller may, for example, verify if a gas flow is measured in a conveying line, before opening an associated shut-off valve to feed the raw material powder into the conveying line. The controller may signal any malfunctions to an operator and/or prohibit operation of the system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
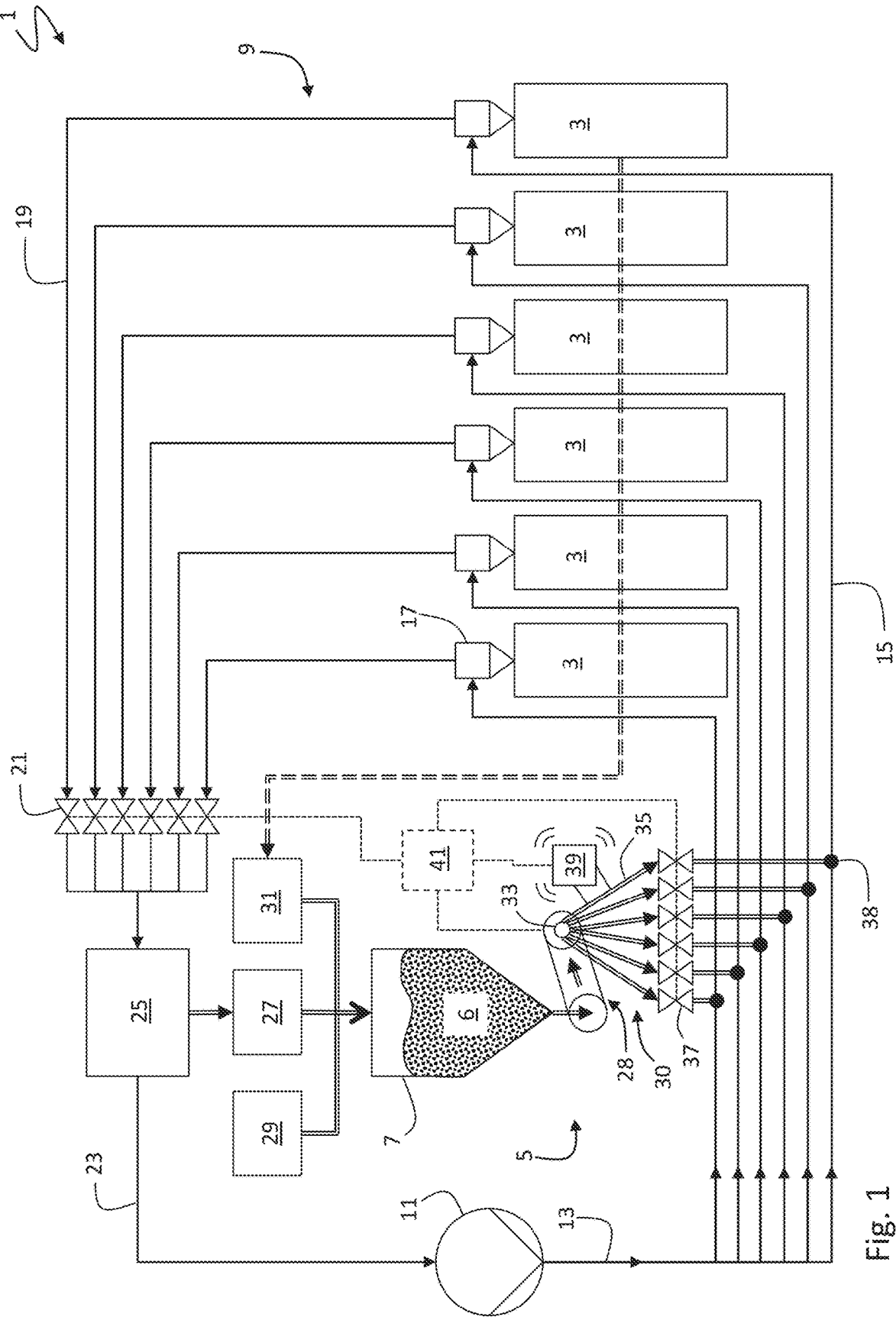
FIG. 1 is a schematic representation of an example of an additive manufacturing facility according to the present disclosure.
Figure 2:
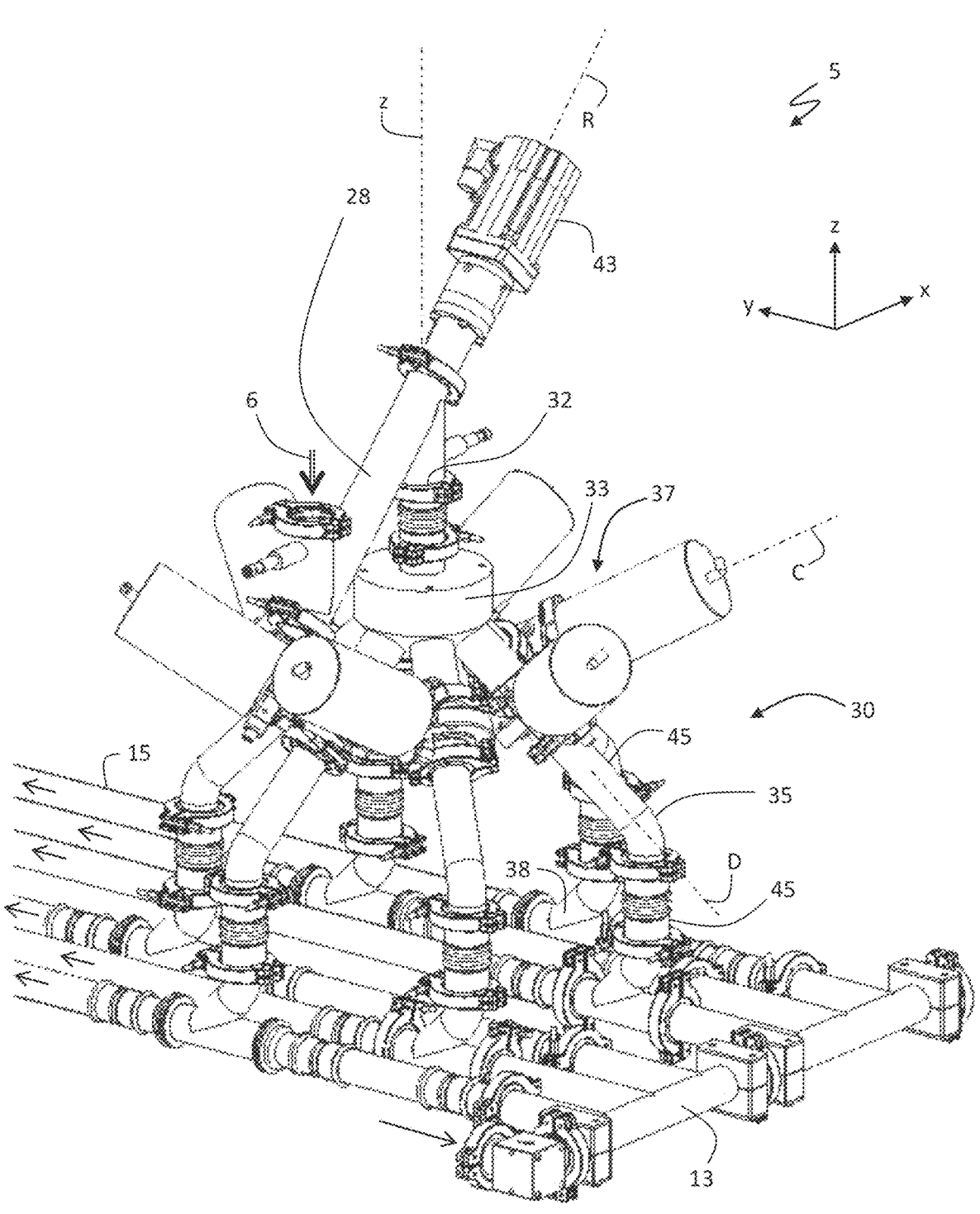
FIG. 2 is a perspective view of an example of a system for distributing raw material powder according to the present disclosure.

Referring to the drawings, FIG. 1 shows an additive manufacturing facility 1 comprising six additive manufacturing machines 3 for parallel additive manufacturing of three-dimensional workpieces. The additive manufacturing facility 1 further comprises a system 5 for distributing raw material powder 6 from a reservoir 7 to the additive manufacturing machines 3. The additive manufacturing facility 1 further comprises a gas flow circulation loop 9 for pneumatically transporting the raw material powder 6 to the additive manufacturing machines 3. A gas flow in the gas flow circulation loop 9 is driven by a gas flow drive 11 in form of a gas pump. A pump outlet line 13 of the gas flow circulation loop 9 is connected to a pressure outlet of the gas pump 11 and splits up into 6 parallel conveying lines 15. Each of the conveying lines 15 leads to a separator 17 associated with and arranged at each of the additive manufacturing machines 3. The separator 17 separator may be a cyclonic separator for extracting the raw material powder 6 from the gas flow to fill a raw material buffer of the associated additive manufacturing machine 3.

Downstream of the separator 17, a gas return line 19, i.e. in sum six parallel gas return lines 19 for each of the six separators 17, returns the gas flow towards gas flow regulation valves 21, wherein each of the gas flow regulation valves 21 is arranged at the end of one of the gas return lines 19. Downstream of the gas flow regulation valves 21, the gas flow is merged into a pump inlet line 23. Before the pump inlet line 23 guides the gas flow into a suction inlet of the gas pump 11, a vacuum conveyer 25 is arranged at the pump inlet line 23 to separate residual amounts of raw material powder in the gas flow. Such separated residual amounts of raw material powder are sifted in sieve 27 and recycled to refill the reservoir 7.

The reservoir 7 is a container in the form of a hopper. The reservoir 7 can be filled via sieve 27 and/or receive virgin raw material powder from a fresh raw material powder supply 29 and/or from a raw material powder recycling system 31. The raw material powder recycling system 31 may receive raw material powder that was not sintered or melted during the additive manufacturing process in the additive manufacturing machines 3 and recycled to be reused (indicated by the dashed double line in FIG. 1).

The system 5 for distributing the raw material powder 6 among the six conveying lines 15 comprises a dosing unit 27 and a feeding manifold 30. The dosing unit 27 is here a screw conveyer arranged below the reservoir 7 to receive the raw material powder 6 falling out of a bottom outlet of the reservoir 7 and to convey the raw material powder 6 with a defined rate upward and sideways towards a manifold inlet 32 of the feeding manifold 30. Below the manifold inlet 32, the feeding manifold 30 comprises a pipe branching 33, where the feeding manifold 30 splits into six manifold branches 35. Each of the manifold branches 35 is equipped with a shut-off valve 37 for selectively allowing raw material powder to fall and/or slide through the manifold branch 35 further downward into the gas flow in the conveying line 15. At the bottom of the feeding manifold 30, each manifold branch 35 comprises a manifold outlet 38 into one of the conveying lines 15. The raw material powder predominantly falls through the feeding manifold 30 from the manifold inlet 32 at the top of the feeding manifold 30 to the manifold outlets 37 at the bottom of the feeding manifold 30 essentially by gravitation.

The system 5 further comprises a shaking unit 39 for shaking and/or vibrating the feeding manifold 30 in order to facilitate falling of the raw material powder through the feeding manifold 30.

The system 5 further comprises a control unit 41 comprising a hard-wired and/or software-programmed controller being in signal connection (single dotted lines in FIG. 1)

with at least one, some or all of: the gas flow regulation valves 21, the shut-off valves 37, the dosing unit 28 and the shaking unit 39. The control unit 41 is configured to control the gas flow regulation valves 21 for allowing a gas flow in only one selected conveying line 15 at a time. Once a steady gas flow is established in a selected conveying line 15, the control unit 41 is configured to open that shut-off valve 37 in the manifold branch 35 which is connected with its manifold outlet 38 to the selected conveying line 15, so that the raw material powder 6 can fall into the gas flow of the selected conveying line 15 for feeding the associated additive manufacturing machine 3 with the raw material powder 6.

The embodiment shown in FIGS. 2 to 5*a*, *b* shows the system 5 as it is preferably implemented in reality. The control unit 41 and the shaking unit 39 are not shown in FIGS. 2 to 5*a, b*. The six conveying lines 15 extend in parallel to each other in y-direction in a common essentially horizontal xy-plane and branch off the pump outlet line 13. The feeding manifold 30 is arranged vertically above the parallel arrangement of conveying lines 15. The dosing unit 28 comprises a screw conveyer extending along an axis R being inclined with respect to a vertical z-axis. The screw conveyer receives the raw material powder 6 from a bottom outlet of the reservoir 7 (not shown in FIG. 2) and conveys the raw material powder aslant upwards along the axis R into the manifold inlet 32 at the top of the feeding manifold 30 (see FIG. 4). The raw material powder 6 is conveyed through the dosing unit 28 in a controlled manner with a defined transportation rate. The control unit 41 controls a dosing unit motor 43 that drives the screw conveyer.

Figure 3:
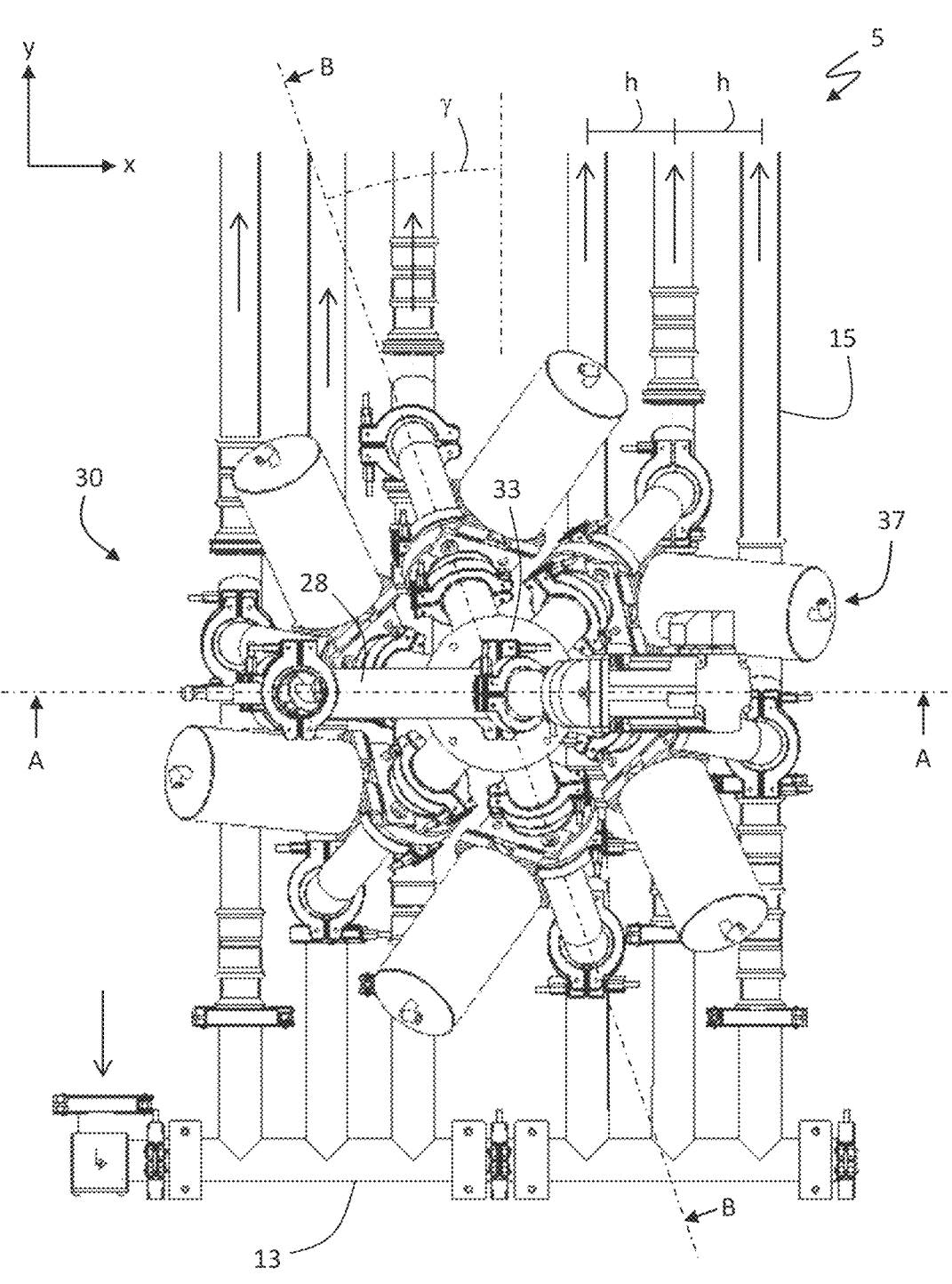
FIG. 3 is a top view of the system shown in FIG. 2.
Figure 4:
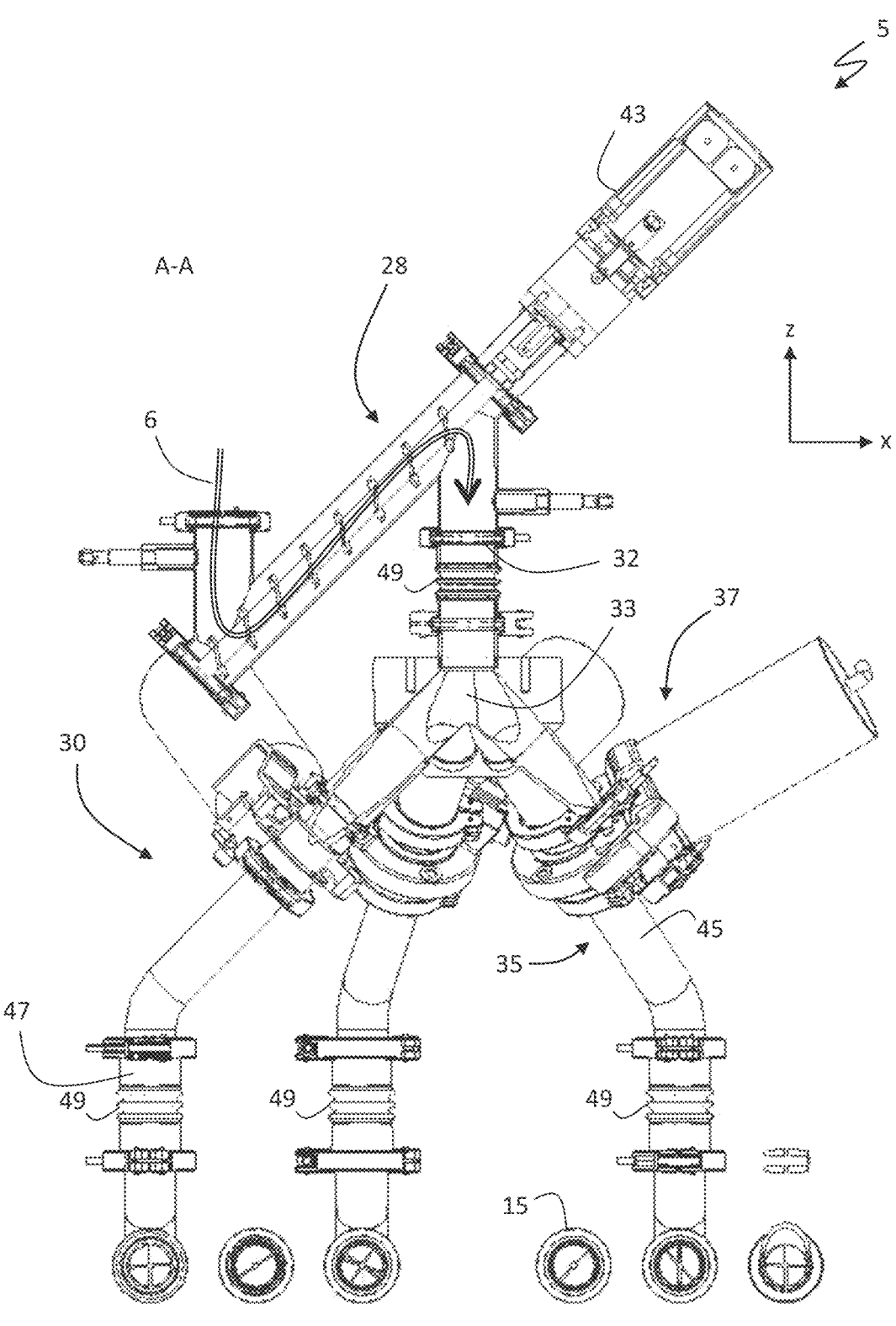
FIG. 4 is a cut view of the system shown in FIG. 3 along the plane A-A.

The raw material powder falls into the manifold inlet 32 and further downward into the feeding manifold 30, that splits into the six manifold branches 35 at the pipe branching 33. The pipe branching 33 comprises a sixfold rotational symmetry with respect to a vertical central axis of the manifold inlet 32 as can be seen in FIG. 3. The manifold branches 35 branch off the pipe branching 33 with an upper inclined section 45 and bends into a lower vertical section 47 being arranged vertically above the associated conveying line 15. The manifold branches 35 end at their manifold outlet 38 into the respective conveying line from above, wherein the manifold branch 35 is bent or inclined in gas flow direction, i.e. in y-direction, to give the raw material powder 6 a momentum component in gas flow direction (y-direction) before it falls into the gas flow in the conveying line 15.

Each manifold branch 35 is equipped at their upper inclined section 45 with a shut-off valve 37. The shut-off valves 37 are preferably butterfly-valves that are actuated about an actuator axis C. The valve body 51 (see FIG. 5*b*) is actuatable about the actuator axis C which extends essentially perpendicular to a longitudinal axis D of the inclined section 45. The actuator axis C and the longitudinal axis D of the inclined section 45 span a virtual plane CD that is inclined with respect to a virtual vertical plane, e.g. zx or xz. The shut-off valves 37 can thereby be arranged in a more compact manner. Furthermore, the actuator axis C being somewhat rotated about axis D has the advantage that raw material powder can slide under the opened valve body 51. The opened valve body 51 is thus less of an obstacle (see FIG. 5*b*). Ideal would be in this respect a horizontal axis C, but that would require more lateral space which would increase the distance of the shut-off valve 37 to the pipe branching 33. Thus, the actuator axis C being rotated about axis D by 10 to 80 degrees with respect to a vertical zD-plane is an advantageous compromise.

At the manifold inlet 32, as well as at each of the vertical sections 47 of the manifold branches 35, the feeding manifold 30 comprises a vibration attenuation element 49 in form of a flexible pipe section in order to decouple the feeding manifold 30 in terms of vibrations from the dosing unit 28 (not shown in FIGS. 2 to 5*a,b*) and the connected conveying lines 15. Thereby, the vibrations generated by the shaking unit 39 are not transferred unattenuated from the feeding manifold 30 towards the dosing unit 28 and/or the conveying lines 15.

Figure 5A:
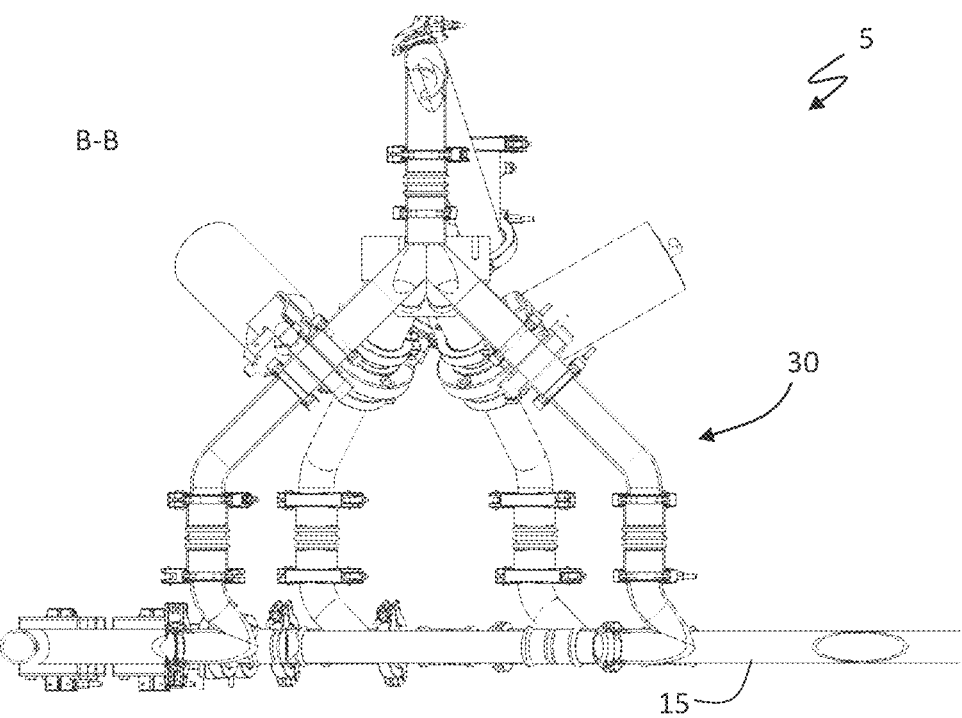
FIG. 5A and FIG. 5B are two cut views of the system shown in FIG. 3 along the plane B-B.
Figure 5B:
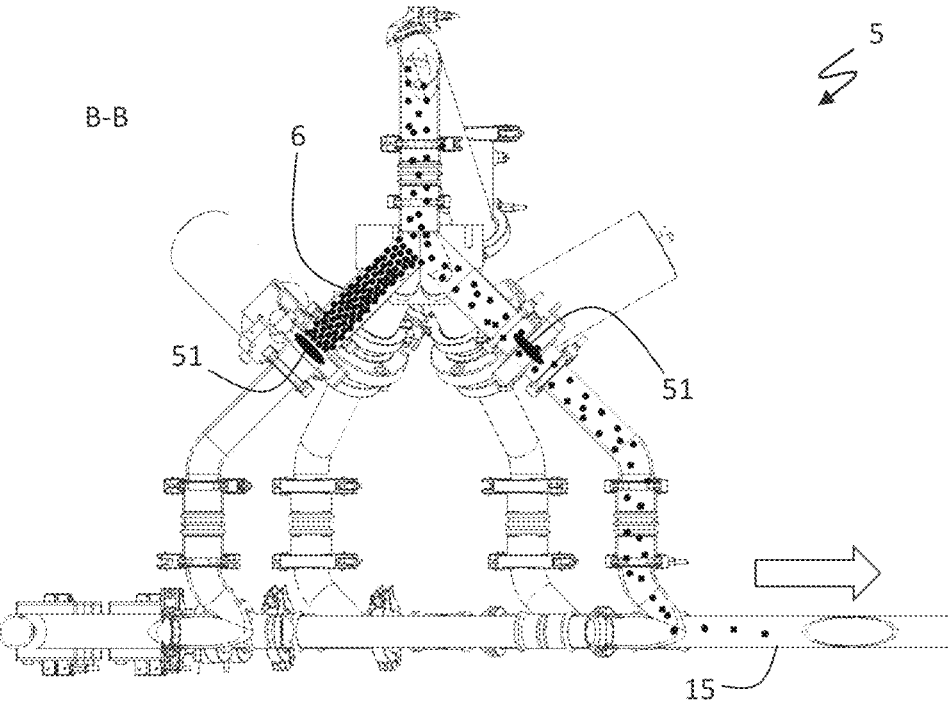

As can be seen in FIG. 3, the vertical sections 47 of the manifold branches 35 are arranged at the corners of a virtual horizontal hexagon. That virtual horizontal hexagon is rotated by an angle γ with approximately γ=30°–arctan(1/ (3√3)), which is about 19.11 degrees with respect to the gas flow direction y in the conveying lines 15. Thereby, the six conveying lines 15 can be arranged in two sets of three conveying lines 15 having the same distance h to each other. The transport of the raw material powder 6 through the system 5 is shown in the cut views of FIGS. 4 and 5*a, b*. If all six shut-off valves 37 are closed, the feeding manifold 25 fills up with raw material up to the manifold inlet 32 when filled by the dosing unit 28. As shown in FIG. 5*b*, opening of one of the shut-off valves 37 allows the raw material powder to fall and/or slide along the manifold branch 35 into the gas flow in the conveying lines 15, where the gas flow immediately carries the raw material powder towards the additive manufacturing machines 3. The distance of the shut-off valve 37 to the pipe branching 33 defines a certain volume within the inclined section 45 of the manifold branch 35 that remains filled with raw material powder as long as the associated shut-off valve 37 is closed. In order to keep this volume at a minimum, the shut-off valves 37 are arranged as close as possible to the pipe branching 33.

While specific embodiments of the invention have been shown and described in detail to illustrate the application of the principles of the invention, it will be understood that the invention may be embodied otherwise without departing from such principles.

LIST OF REFERENCE NUMERALS 1 additive manufacturing facility
3 additive manufacturing machine
5 system for distributing raw material powder
6 raw material powder
7 reservoir
9 gas circulation loop
11 gas flow drive
13 pump outlet line
15 conveying line
17 separator
19 gas return line
21 gas flow regulation valve
23 pump inlet line
25 vacuum conveyor
27 sieve
28 dosing unit
29 fresh raw material powder supply
30 feeding manifold
31 raw material powder recycling system
32 manifold inlet
33 pipe branching
35 manifold branch
37 shut-off valve
38 manifold outlet
39 shaking unit 41 control unit
43 dosing unit motor
45 inclined section of manifold branch
47 vertical section of manifold branch
49 vibration attenuation element
51 valve body
γ angle
h distance

The invention claimed is:

1. A system for distributing raw material powder from a reservoir of raw material powder to a plurality of at least two additive manufacturing machines for additive manufacturing, the system comprising:
at least one gas flow drive;
at least two conveying lines for conveying the raw material powder to the at least two additive manufacturing machines by a gas flow driven by the at least one gas flow drive; and
a feeding manifold for feeding the at least two conveying lines with the raw material powder, wherein the feeding manifold is configured and arranged to selectively guide, controlled by means of at least two shut-off valves, the raw material powder into one of the at least two conveying lines, wherein each of the at least two shut-off valves is arranged at the feeding manifold and configured to selectively close and open for selectively feeding the at least two conveying lines with the raw material powder.

2. The system according to claim 1, wherein the feeding manifold further comprises:
a manifold inlet for receiving the raw material powder from the reservoir;
a pipe branching into at least two manifold branches; and
at least two manifold outlets each in connection with one of the at least two conveying lines, wherein each of the at least two manifold branches connects the manifold inlet to one of the at least two manifold outlets, wherein each of the at least two shut-off valves is associated with and arranged at one of the at least two manifold branches and configured to selectively close and open the associated manifold branch.

3. The system according to claim 2, wherein the pipe branching is configured to be located at a higher altitude than the at least two manifold outlets, so that the raw material powder is transported through the at least two manifold branches predominantly by gravitation.

4. The system according to claim 1, wherein the feeding manifold is configured to be arranged above a section of each of the at least two conveying lines, and wherein each manifold outlet leads essentially from above into the section of one of the at least two conveying lines.

5. The system according to claim 1, wherein the feeding manifold is formed to eject the raw material powder into the at least two conveying lines with a momentum component parallel to a conveying direction along the conveying lines.

6. The system according to claim 1, wherein the feeding manifold comprises a pipe branching into at least two manifold branches, wherein each of the at least two manifold branches comprises an inclined section, which is inclined by 20 to 70 degrees with respect to a central vertical axis of a manifold inlet.

7. The system according to claim 1, wherein sections of each of the at least two conveying lines are arranged essentially in parallel below the feeding manifold.

8. The system according to claim 1, wherein each of the at least two shut-off valves is a butterfly valve.

9. The system according to claim 1, wherein each of the at least two shut-off valves is arranged at an inclined section of one of at least two manifold branches of the feeding manifold and comprises a valve body actuatable around an actuator axis essentially perpendicular to a longitudinal axis of the inclined section of the manifold branch, wherein the actuator axis and the longitudinal axis of the inclined section of the manifold branch span a virtual plane that is inclined with respect to a virtual vertical plane.

10. The system according to claim 1, further comprising a dosing unit, wherein the dosing unit comprises a conveying mechanism for conveying a controlled flow of the raw material powder from an outlet of the reservoir to a manifold inlet.

11. The system according to claim 10, wherein the dosing unit comprises a screw conveyor, wherein the screw conveyor is arranged and configured to convey the raw material powder from a first position at the outlet of the reservoir to a second position at the manifold inlet, wherein the second position is at a higher altitude than the first position and/or wherein the second position is horizontally distanced from the first position.

12. The system according to claim 1, wherein the at least two shut-off valves are configured to open only one of the at least two shut-off valves at a time.

13. The system according to claim 1, wherein the at least two shut-off valves are arranged closer to a pipe branching of the feeding manifold than to the at least two conveying lines.

14. The system according to claim 1, further comprising a shaking unit for shaking and/or vibrating the feeding manifold to facilitate falling of the raw material powder through the feeding manifold.

15. The system according to claim 1, wherein the feeding manifold comprises at least one vibration attenuation element for attenuating propagation of vibrations from the feeding manifold to the at least two conveying lines and/or towards the reservoir.

16. The system according to claim 1, wherein the at least two conveying lines are free of gas flow regulation valves downstream of the feeding manifold and upstream of the at least two additive manufacturing machines.

17. The system according to claim 1, wherein the at least two conveying lines are part of a gas flow circulation loop, wherein the gas flow drive is configured to drive a gas flow circulating in the gas flow circulation loop.

18. The system according to claim 1, further comprising at least two gas flow regulation valves, wherein each of the at least two gas flow regulation valves is associated with one of the at least two conveying lines for selectively regulating the gas flow in the associated conveying line, wherein the at least two gas flow regulation valves are arranged downstream of at least two additive manufacturing machines and upstream of the feeding manifold.

19. An additive manufacturing facility comprising:
a plurality of at least two additive manufacturing machines for parallel additive manufacturing of three-dimensional work pieces, and
a system according to any of the preceding claims for distributing raw material powder from a reservoir of raw material powder to the at least two additive manufacturing machines.

20. A method for distributing raw material powder from a reservoir of raw material powder to a plurality of at least two additive manufacturing machines for parallel additive manufacturing of three-dimensional work pieces, the method comprising:

selectively regulating a gas flow in at least two conveying lines, wherein each of the at least two conveying lines is associated with one of the at least two additive manufacturing machines for the conveying raw material powder to the associated additive manufacturing machine by the gas flow; and selectively opening and closing at least two shut-off valves of a feeding manifold, wherein each shut-off valve is associated with one of the at least two conveying lines for selectively letting raw material powder fall into the gas flow in the associated conveying line.

21. The method according to claim 20, wherein the gas flow is selectively regulated before any one of the at least two shut-off valves is opened.

22. The method according to claim 20, wherein the gas flow is selectively regulated by at least two gas flow regulation valves, wherein each of the at least two gas flow regulation valves is associated with one of the at least two conveying lines for selectively regulating the gas flow in the associated conveying line, wherein the at least two gas flow regulation valves are arranged downstream of the at least two additive manufacturing machines and upstream of the feeding manifold.

23. The method according to claim 20, wherein the gas flow is selectively regulated to allow a gas flow in only one of the at least two conveying lines at a time.

24. The method according to claim 20, wherein only one of the at least two shut-off valves is opened at a time, which is the shut-off valve that is associated with the conveying line currently having a gas flow.

25. The method according to claim 20, wherein the gas flow in the associated conveying line is regulated to be essentially constant.

* * * * *